C. H. AVERY.
CALCULATING APPARATUS.
APPLICATION FILED JULY 3, 1911.

1,004,339.

Patented Sept. 26, 1911.

WITNESSES
Mary A. Tryhan
Mary A. O'Brien

INVENTOR
Charles H. Avery
BY
Mitchell, Chadwick & Kent
ATT'YS.

UNITED STATES PATENT OFFICE.

CHARLES H. AVERY, OF NEWTONVILLE, MASSACHUSETTS.

CALCULATING APPARATUS.

1,004,339.

Specification of Letters Patent. Patented Sept. 26, 1911.

Application filed July 3, 1911. Serial No. 636,564.

*To all whom it may concern:*

Be it known that I, CHARLES H. AVERY, a citizen of the United States, residing at Newtonville, in the county of Middlesex and State of Massachusetts, have invented new and useful Improvements in Calculating Apparatus, of which the following is a specification.

This invention relates to improvements in calculating apparatus.

The object of the invention is to produce a simple appliance by which certain calculations necessary in some commercial operations may be expeditiously effected without figuring or computation by the user.

The invention is here illustrated as applied to compute the cost of wool per pound after being cleaned, the cost of the wool in the grease and its shrinkage being known. This operation would ordinarily involve a computation to find what amount of pure wool is contained in a pound of the grease wool and then, assuming that fraction of a pound of clean wool to have cost the price paid for a pound of the grease wool, a further computation to find the cost of the clean wool per pound.

Apparatus for effecting this and other somewhat similar computations is illustrated in the accompanying drawing, in which—

Figure 1:
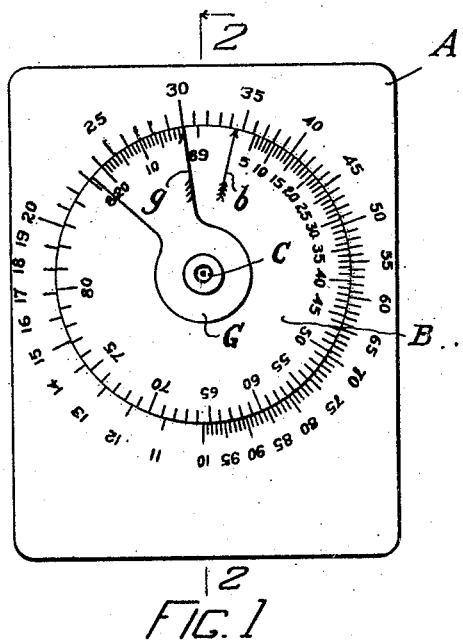
Figure 2:
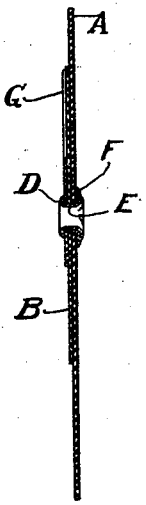

Figure 1 represents a face view, and Fig. 2 a section on the line 2—2 of Fig. 1.

Referring to the drawings A is a plate which may be of metal, celluloid or other suitable material; B is another plate which may be of similar material and is circular in form; and these two plates are fastened pivotally together at C in any convenient manner. The means here illustrated consists of an eyelet D, its post E passing through both plates, and the other member which is marked F is in the form of a flange on the back of the two plates and has a central perforation through which the post E of the eyelet D is spread and clamped on the back side thereof. Thus the two plates are clamped together between the eyelet D and flange C and are capable of rotation relative to each other about the central post E as an axis or shaft. A sector G may be similarly fastened rotatively about the same axis. On the plate A is a logarithmic scale, the divisions of which are marked values running from 10 to 100 in the ordinary way. The length of the scale is such that it runs completely around a circle on a line coinciding with the circumference of the plate B. The plate B bears a logarithmic scale at its edge running around the circumference in the opposite direction from that in which the scale of A runs. This scale is in other respects identical with the scale of A except that the values marked on the divisions of the scale are different, as follows: The value assigned to a point on the scale instead of being its value as on A or on other customary scales is the difference between such value and 100. Thus the point marked 5 on the scale of B corresponds to a point which in the other scale is at the same distance from the point of beginning in the opposite direction and is marked 95.

The point which in the scale of A is marked 60 corresponds, in distance from the point of beginning, to a point in the scale of B marked 40, equidistant from the point of beginning in the opposite direction.

The scale of B, like that of A, covers a complete circumference, the values thereof running from 0 to 90. The point of beginning and ending may conveniently be indicated, as shown in the drawing by an arrow $b$.

In operation, to make the computation mentioned above, the user turns the plate B about its pivot until the arrow stands at a distance in the scale of A from the point of beginning representing the known grease cost. He then measures along the scale of B a distance according to the amount of the assumed shrinkage. He then observes the point opposite this on the scale of A, which is at a distance from the beginning of the scale A corresponding to the value of the wool in cents per pound after the grease has been removed, which is the end of the computation. To illustrate, let it be assumed that the grease cost is 34½ cents per pound and that it is desired to know what the clean cost would be of the wool remaining after a shrinkage assumed to be 39%. If this computation be executed in figures, it is necessary first to subtract the percentage 39 from 100, which leaves 61/100 of a pound as the amount of clean wool derived from a pound of wool in the grease. It is then required to know what the value of this clean wool is per pound, 61/100 of a pound having cost 34.5 cents. This operation involves dividing 34.5 cents by 61 and multiplying by 100, which gives as a result 56½ cents, which is the desired answer.

The drawing illustrates the execution of this computation on the apparatus, as follows: The scale of B is shown rotated to the distance 34½ on the scale of A, as shown by the position of the arrow. The user then refers to the point 39 on the scale of B, this figure being the assumed percentage of shrinkage, and opposite that he finds a point on the scale of A, whose value, measured from the point of beginning, is 56.5. If there be doubt as to precisely what is the correct assumption of shrinkage, he can read directly from the scale, instantaneously and without resetting, the results of a variety of computations, each assuming a different shrinkage; as for example, if he thinks that the shrinkage may amount to 40% and will not go under 35% he can read from the scale of A that the clean cost may lie between 57.3 and 53 cents. In its operation, by reason of the reversal of direction of the scale of B and the arbitrary marking of values thereon corresponding not to the normal logarithmic values of the distances from the point of beginning but marked with the difference between the normal value and 100, the apparatus performs the operations of subtracting the percentage of shrinkage from 100, and then dividing the value assumed on the scale of A by the result of the subtraction, and shows the quotient on the scale of A.

The scale of B, the complete circumference of which is marked from 0 to 90 is in reality, as already explained, the same as the scale of A reversed, and the total length of its circumference is the logarithmic value of 100. A principal element contributing to the novel result lies in the arrangement of this logarithmic length as a complete circumference. When therefore it is desired to divide 34½ by the percentage of clean wool in a pound of grease wool, which is the difference between 100% and the 39% shrinkage, the operation may be conceived as a subtraction (on the scale of A) of that portion of a complete circumference remaining after the shrinkage has been deducted from it. Traveling backward around the scale of B from the arrow, a complete circumference would bring one to the point of starting; or if one goes, in the backward direction, a distance less than a complete circumference the result will be a subtraction of the logarithmic value of that lesser distance. Going back a complete circumference from a point would divide by 100 the number represented by that point. Going back a distance less than a complete circumference would divide the number by some number less than a hundred, according to the distance. The same result can be reached by going forward along the scale a distance equal to the difference between that backward distance and the complete circumference, which is the same as going forward a distance equal to the difference between 100 and the number which is to be used as division. If the user of the apparatus, in the illustration chosen, desires to divide 34½ by 61, he can go backward around the scale of B till he has measured the logarithmic distance of 61, opposite which on the scale of A will be found the logarithm of the desired answer. This logarithmic distance of 61 can however, in apparatus constructed as described, be also found by going forward from 34½ on A to the point 39 on B, which figure is the difference between 100 and 61, as the numbering of the scale of B starts from 0 at the arrow, and proceeds in direction reverse to that of the logarithmic scale and with each marked value being the difference between the true logarithmic value of the point marked and of 100. Consequently by starting forward from 34½ on A and finding the point marked 39 on B one finds the subtracted logarithmic distance of 61, which is equivalent to dividing the number 34½ by 61.

Instead of subtracting backward around the circle, apparatus may be used for some purposes in which the computation involves additional or traveling forward around the circle to a point determined by the difference between its numerical value and 100. Thus, if a buyer be willing to pay 56.5 per pound for clean wool and desires to know what price in grease would be the equivalent of it at an assumed shrinkage of 39%, he may set the disk B with its mark 39 opposite the position 56.5 on the scale of A; and he then by noting the location of the arrow finds the answer 34½. The logarithmic operation is that the logarithm of 61 (from the point marked 39 around to the arrow) has been added to the logarithm of 56.5, the addition carrying past the end of the scale on A and as far as the distance 34½ beyond. By the described marking the distance corresponding to the logarithm 61 is added by merely setting the point 39 on the scale of A and noting the arrow or zero point.

For some purposes it is immaterial whether the logarithmic scales run in opposite directions from the zero point as illustrated or run in the same direction.

A discount computer may be combined with this by providing a sector G of a third disk and fastened to the other pivotally in a similar manner, in which the scale runs the same as scale of A, but the values are assigned in opposite direction thereto, being, as on the disk B, the difference between the true logarithmic value of the point and of 100. As illustrated a half arrow $g$ is marked to indicate the zero point of the sector. To use this the sector is moved till the half arrow is opposite the price, e. g. 30, from which the discount is to be computed, and the figure on the scale of A opposite the figure of discount is the price with discount deducted.

While the foregoing illustrates the principle of the discount computer, it is not in practice limited to use with a shrinkage computer; and indeed it will probably not generally be so used. It is a common thing for merchandise to be sold with two or more discounts from a quoted price; as for example, "40 and 10% off." For use in such cases the apparatus would be made with a logarithmic scale on A like that illustrated, but the scales used in connection with it would be, first, a sector (or complete circle) in place of B, bearing as large a portion as desired of the scale and marking, of whch a fragment is now shown on G; and, second, the sector G. In using such, the arrow on the first discount scale would be pointed at the quoted price on A, and the half arrow on G pointed at the first discount, whereupon the result would be found opposite the point marked corresponding to the second discount, without its being necessary to get the intermediate figure on which the second discount is computed.

I claim:—

1. Calculating apparatus comprising two plates pivotally joined together, one of them being circular and each having a logarithmic scale along the circumference of the circular plate; said scales being identical and reversed in direction, and the points of one of them being marked with values equal to the differences between the true logarithmic values of such points and 100.

2. Calculating apparatus comprising two plates pivotally joined together, one of them being circular and each having a logarithmic scale along the circumference of the circular plate; said scales being identical and the points of one of them being marked with values equal to the difference between the true logarithmic values of such points and 100.

3. Calculating apparatus comprising two plates pivotally joined together, one of them being circular and each having a logarithmic scale along the circumference of the circular plate; said scales being identical and the points of one of them being marked with values equal to the difference between the true logarithmic values of such points and 100; combined with a sector of a third plate pivoted on the same axis and overlying the upper plate, and bearing the terminal portion of a logarithmic scale like the others marked with values equal to the difference between 100 and the true logarithmic values of such points.

Signed by me at Boston, Mass., this 29th day of June, 1911.

CHARLES H. AVERY.

Witnesses:
 JOSEPH T. BRENNAN,
 A. B. LINDSAY,